United States Patent [19]

Savit

[11] 4,454,058

[45] Jun. 12, 1984

[54] CHEMICAL SOLUTION FOR INCREASING THE SURFACE CONDUCTIVITY AND/OR THE VOLUME CONDUCTIVITY OF A SUBSTRATE

[76] Inventor: Joseph Savit, 751 Vernon Ave., Glencoe, Ill. 60022

[21] Appl. No.: 463,733

[22] Filed: Feb. 4, 1983

[51] Int. Cl.³ ............................ C08L 1/18; H01B 1/00
[52] U.S. Cl. ................................... 252/500; 106/186; 106/188; 106/189; 106/195
[58] Field of Search ...................... 106/186, 188, 195; 252/500

[56] References Cited

U.S. PATENT DOCUMENTS

| | | | |
|---|---|---|---|
| 2,895,844 | 7/1959 | Bader | 106/195 |
| 3,288,770 | 11/1966 | Butler | 524/815 |
| 3,401,047 | 9/1968 | Garden et al. | 106/186 |
| 3,493,369 | 2/1970 | Busch et al. | 252/500 |
| 3,674,711 | 7/1972 | Growald | 252/500 |
| 3,798,032 | 3/1974 | Miller | 252/500 |

Primary Examiner—Theodore Morris
Attorney, Agent, or Firm—Lester J. Savit

[57] ABSTRACT

A chemical solution to be applied to a substrate either as a surface coating or as an impregnating solution which, in both cases, increases the conductivity and in the case of impregnation also increases the dimensional stability of the substrate. The solution consists of nitrocellulose and a quaternary ammonium compound both dissolved in ethylene glycol monomethyl ether or, alternatively, methyl alcohol. The porous substrates such as paper, vellum and permeable materials like cellophane may be impregnated with the solution. Both the porous and permeable substrates and non-porous substrates, such as polyester films, may utilize the benefits of this solution as a face, back or intermediate conductive surface coating. The chemical solution can also be kneaded in film compounds before casting to reduce film resistivity.

15 Claims, 1 Drawing Figure

CHEMICAL SOLUTION FOR INCREASING THE SURFACE CONDUCTIVITY AND/OR THE VOLUME CONDUCTIVITY OF A SUBSTRATE

BACKGROUND OF THE INVENTION

Generally, the invention relates to solutions for coating or impregnating substrates. In particular, the invention relates to chemical solutions which increase the conductivity of a substrate when used as either an impregnating solution or a surface coating. The dimensional stability of porous and permeable substrates (such as cellophane) is improved when impregnated with the solution.

Some types of dielectric copying and printing require a printing medium substrate which is through-conductive, and which contains a dielectric coating on one surface. Usually, the substrate is comprised of a through-conductive material having a top surface and a bottom surface. The substrate is through-conductive when an electric current can be made to flow between the top surface and the bottom surface in response to an electrical potential applied between the surfaces. Substrates such as paper, vellum and cellophane are not normally sufficiently through-conductive. However, by impregnating with a conductive chemical solution, the paper, vellum or cellophane will absorb this chemical solution and become satisfactorily conductive. Previously, chemical solutions such as quaternary ammonium compounds and other polymers have been used as impregnating solutions.

In addition, a method of imparting volume conductivity into non-porous films is to knead the conductive chemical solution into the film compound before casting. This method is particularly appropriate for alcohol soluble or compatable resin films.

Surface conductivity also is a desired characteristic of printing, copying and other substrates. Non-porous substrate materials such as polyester film are not capable of being impregnated by a conductive solution. However, solutions to increase the surface-conductivity can be coated on back and/or front surfaces of the substrate.

In the past, nitrocellulose was used to bind conductive substances to a substrate surface. Conductive pigments such as carbon black or zinc oxide were added to the nitrocellulose to provide a conductive coating. However, the pigments increased the opacity of the coating. Consequently, these coatings cannot be used on x-ray or other films requiring a high degree of clarity.

Cellophane normally holds about 7% water. In spite of a surface coating of nitrocellulose (with or without conductive pigments) being applied to the cellophane back and a dielectric coating on the surface an increase in humidity of the surrounding environment from 70% to 90% relative humidity, produces an increase in water in the cellophane from 7% to 20%. This increase in water content causes an increase in dimensions of the cellophane. Consequently, the surface coating of dielectric face coatings and nitrocellulose back coatings usually crack above 70% relative humidity. Use of other substances for moisture barrier surface coatings on cellophane such as Saran TM act as electrical insulators and therefore cannot be used. Also, paraffin wax has been mixed with the nitrocellulose to increase its moisture barrier qualities. However, this wax forms a monomolecular electrical insulating surface on the cellophane and therefore can't be used as conductive coating.

What is desired is a solution which increases the conductivity and the dimensional stability of the cellophane substrate. The substances favored for their conductive and dimensional stability characteristics have not been compatible with one another. For example, the conductive impregnating polymers such as the quaternary ammonium compounds were normally dissolved in polar substances such as water. Calgon 261LV is a water soluble quaternary ammonium compound packaged as 40% polymer dissolved in 60% water. More recently, impregnating solutions utilizing conductive polymers have included ethylene glycol monomethyl ether (EM) or, alternatively, methyl alcohol. While nitrocellulose is totally incompatible with systems containing water, it has been known that nitrocellulose is dissolvable in EM. However, no formulations in the past have been able to combine the extremely good conductivity characteristics of the quaternary ammonium polymers with the extraordinarily good dimensional stabilizing and film forming characteristics of nitrocellulose.

What also is desired are clear, transparent conductive coatings with non-tacky and durable film characteristics that can be coated with good adhesion on both porous and non-porous materials. These conductive coatings are particularly useful in x-ray imaging systems, dielectric copying systems, and anti-static reduction utilizing polyesters and other films.

SUMMARY OF THE INVENTION

In accordance with this invention, a solution is made using ethylene glycol monomethyl ether or methyl alcohol as a solvent for both nitrocellulose and a quaternary ammonium compound dissolved in water. Accordingly, the conductive polymer dissolved in water can be incorporated with hydrophobic nitrocellulose using a special solvent system. This system combines the very good conductivity characteristics of the quaternary ammonium compounds with the very good dimensional stabilizing film forming and electrical characteristics of nitrocellulose. Consequently, the solution is extraordinarily versatile and can be used both as an impregnating solution to increase dimensional stability and through-conductivity of porous and permeable substrates, and also as a coating to increase the surface-conductivity of a substrate. The clear character of the solution makes it ideally suited for a conductive coating on x-ray and other types of films and as an anti-static coating on films. However, the solution can also be pigmented to give the substrate desirable qualities.

The solution can be used as an impregnating solution in substrates such as cellophane, paper or vellum. It also can be used as a surface coating for paper, vellum or cellphane. Other substrates such as polyester, which are not capable of being impregnated with the chemical solution, can utilize the properties of the solution as a surface coating.

The relative proportions of nitrocellulose and quaternary ammonium compound may be varied according to their use. When increased conductivity is required, a higher percentage of conductive polymer can be used. However, when the dimensional stabilizing characteristics and film forming characteristics are more desirable, a higher percentage of nitrocellulose can be used. The surprising solvent ability of the ethylene glycol monomethyl ether and/or methyl alcohol allow for the mutual solubility of the two described ingredients in a wide range of proportions.

DETAILED DESCRIPTION OF THE INVENTION

Figure 1:
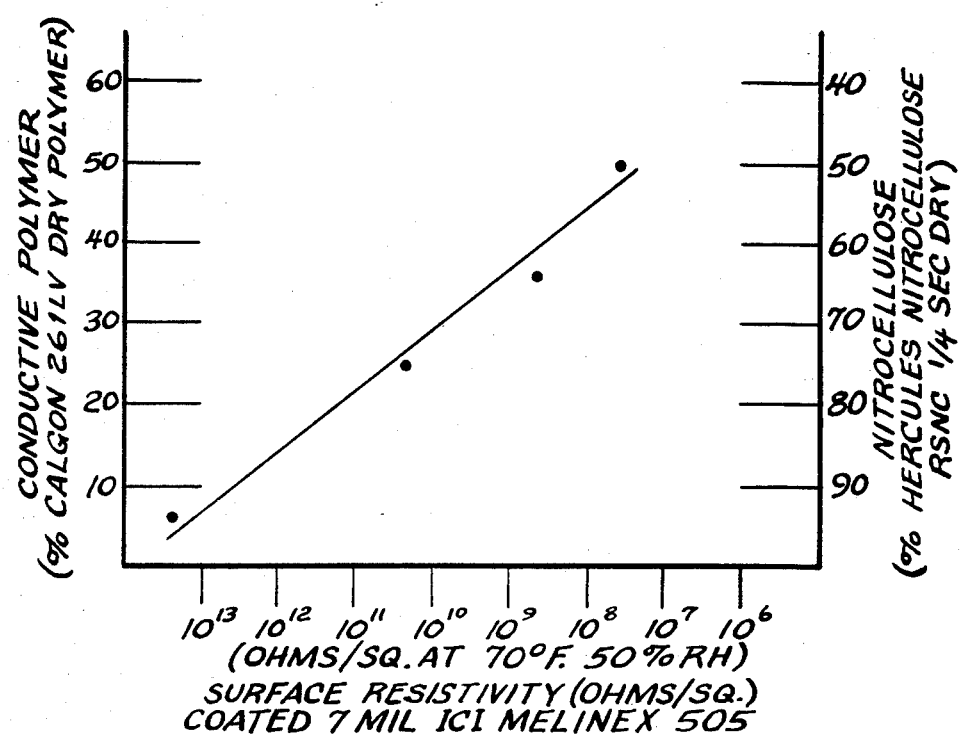
FIG. 1 is a graphic representation of surface resistivity in comparison to varying relative proportions of conductive polymer and nitrocellulose in the present invention.

The solvent system utilizes ethylene glycol monomethyl ether or methyl alcohol as the solvent for both nitrocellulose and a quaternary ammonium compound. The preferred quaternary ammonium compound is sold as Calgon 261, which is 60% water and 40% polymer. Specifically, the polymer is polydimethyldiallyl ammonium chloride described in U.S. Pat. No. 3,288,770. The preferred nitrocellulose is commercially made by Hercules under the name RS Grade ¼ sec. nitrocellulose (RSNC). Nitrocellulose is normally sold wetted with a 30% isopropyl alcohol in order to decrease its explosive qualities. Ammonium quaternary compounds are excellent compounds for increasing the through or surface conductivity of a substrate. These two compounds coexist in a wide range of percentages while maintaining their solubility in the ethylene glycol monomethyl ether. Consequently, the relative proportions of the quaternary ammonium compound and the nitrocellulose can be adjusted within a wide range without danger of one or other of the ingredients coming out of the solution.

The proportions of nitrocellulose and quaternary ammonium polymer may range from 6% conductive polymer and 94% nitrocellulose, to 35% nitrocellulose and 65% conductive polymer. At least 40% of the solvent system needs to be the ethylene glycol monomethyl ether and it can be as high as 80%. Alternatively, the ranges may vary within the solubility ranges discussed above. Water is carried into the formulation as the solvent (60%) of 261LV sold by Calgon and of course, then the 70% nitrocellulose and 40% conductive polymer make up from 20% to 60% of the solution. Therefore, acceptable ranges of (dry) nitrocellulose in the total solution are 4.9 to 39.5% and of (dry) conductive polymer in the total solution are 0.5 to 15.6%.

Isopropyl alcohol (30%) carried into the solution with the nitrocellulose makes up a certain percentage of the preferred solution. The preferred embodiment, which is the most versatile solution that can be used for both impregnating and coating purposes, is about one part ammonium quaternary compound to one part nitrocellulose in solution.

The preferred system consists of 69.7% ethylene glycol monomethyl ether, 7.7% quaternary ammonium compound (261LV), 7.7% nitrocellulose, 3.3% isopropyl alcohol and 11% water. See Example I for full details of the preferred solution.

FIG. 1 indicates increasing conductivity as the relative proportion of polymer increases with respect to the percentage of nitrocellulose, up to the preferred 1 to 1 proportion. The plot shows that the replacement of nitrocellulose with conductive polymer produces reduced surface resistivity, i.e., increased conductivity, in the substrate treated with the chemical solution. Note that the X-axis representation of surface resistivity is expressed in exponentially decreasing units.

The two main uses of the solution are as an impregnating solution to increase through-conductivity and dimensional stability of the substrate and as a coating to increase surface conductivity of the substrate.

Paper, vellum, cellophane or other porous and permeable substrates may be impregnated with the solution. This is accomplished by running the substrate off a feed roll through a conductive solution impregnating treatment mechanism at a speed of approximately 50 feet per minute. The conductive treatment solution, preferable at room temperature and having a viscosity of about 24 seconds, as measured with Zahn cup #2, is contained in a tank with about 14 inches length of substrate being submerged in conductive treatment solution at any time. The solution is carried about 7 feet to nip rollers made of rubber and/or steel or other materials which remove excessive conductive treatment solution from the substrate to facilitate drying and to squeeze the conductive treatment solution into a cellophane, vellum or paper substrate to provide increased and more uniform through-conductivity. The pressure exerted on the substrate by the nip rollers is approximately 45 to 60 pounds per square inch, although this range is not critical. The substrate then enters a heated air drier oven located about 4 feet from the nip rollers. The temperature of the oven is preferably 125° Fahrenheit, although, alternatively, any temperature in the oven suitable for drying the substrate may be used. Approximately 20 feet of cellophane, paper or vellum substrate is contained in the heated air oven at any given time. The dried cellophane, paper or vellum substrate exits from the oven and is wound up on a roll. This treatment reduces the surface resistivity of the cellophane, paper or vellum substrate from about $10^{11}$ to $10^9$ ohms per square to approximately $10^9$ to $10^7$ ohms per square. This treatment also reduces the volume resistivity of the substrate from approximately $10^{10}$ to $10^8$ ohms-inches. The treatment also reduces the tack commonly associated with conductive polymers. Alternatively, any suitable method of applying the conduct treatment may be used as those referred to in "Fundamentals to Consider in Selecting the Coating Method" by R. J. Jacobs, "Paper Film and Foil Converter", February-July 1963, published by McLean Hunter Corporation, Chicago, Illinois.

The solution also may be used as a coating on the paper, vellum, cellophane or other porous or permeable substrate which can be impregnated with the solution. Non-porous films can utilize the advantages of the solution as a surface coating. For example, polyester film is not capable of being impregnated with the solution but can be coated with the solution. The coating is normally accomplished to a thickness in the range of about 0.1 to 3.5 mils, which is equivalent to approximately 0.1 pound to 4 pounds of conductive coating material per 3,000 square feet of substrate surface area.

The preferred method of applying the conductive coating is to utilize a Meyer rod coater, such as that manufactured by Black Clawson Company or the Midland Ross Company of New Jersey, with a No. 14 Meyer rod and a web speed of 1,000 yards per hour. The coating solution is applied at room temperature with a viscosity of about 24 seconds, as measured using a Zahn Cup No. 2. The first 20 foot long air dryer oven of the Meyer rod coater is set at 125° F. The second 20 foot long dryer oven is set at 150° F. The use of the Meyer rod coater is described in "Fundamentals to Consider in Selecting Coater Methods", by R. J. Jacobs.

In particular, there are at least four uses for this solution. This listing is not meant to be a limitation of the invention but merely an illustration and description. The first known use of this solution is as an impregnating solution for cellophane. A pigmented nitrocellulose conductive back and pigmented dielectric face coating will reduce effects of humidity changes on the substrate at below 70% relative humidity. However, when ambient relative humidity approaches 90% or higher, the water content of the substrate may go from 7% to 20%. This drastic increase in water content causes the substrate to swell and the conductive back and dielectric face coatings to crack. Consequently, the face and back coatings are ineffective as moisture barriers above 70% relative humidity. However, when the cellophane substrate is impregnated with the solution as described, little increase in swelling is seen, even at the 70 to 90 percent relative humidity range and the coatings do not crack.

The second use of the solution is as an under coating on the face of polyester film between an insulator layer and the polyester substrate. Previously, because of the requirements of a clear transparent conductive under layer, a vacuum deposition of the Indium oxide or other metal was required. However, the present invention allows the combination of a conductive quaternary compound and nitrocellulose in a single conductive solution. Consequently, a highly conductive, clear coating is obtained. Conductive strips may be laid on top or into the conductive coating layer to ground the conductive layer underneath the insulator layer.

A third use is as a conductive back coating on non-silver, polyester x-ray film. The clear transparent characteristics again are important and make this a much cheaper and simpler alternative to vacuum deposition of Indium oxide or other thin metal film. The back coating has sufficient conductive characteristics to allow an image to be formed on the face of the x-ray film.

A fourth use of the solution is as a conductive coating to reduce the tendency of the formation of static charge on a substrate or material. A higher percentage of nitrocellulose relative to conductive polymer may be used. However, the conductive polymer does serve the essential role of providing adequate conductivity in a clear transparent coating as an anti-static coating. The solution set out in Example II is well-suited for use as an anti-static coating.

The composition is made by dissolving first the polymer water solution into the ethylene glycol monomethyl ether or methyl alcohol. Secondly, the nitrocellulose is dissolved in another aliquot of ethylene glycol monomethyl ether or methyl alcohol. The two solutions are then mixed to create the stable system of nitrocellulose and quarternary ammonium compound. Once the system is created this way, it is stable. However, if the nitrocellulose is added to the conductive polymer in water, the nitrocellulose will not go into the solution. Also, if you attempt to dissolve nitrocellulose directly in the EM solvent containing the polymer, the nitrocellulose or conductive polymer may have a tendency to precipitate out. Therefore, the method of dissolving nitrocellulose and the polymer separately in ethylene glycol monomethyl ether (EM) or methyl alcohol appears to avoid these problems.

Surface and volume conductivity increases as the percentage of conductive polymer in the solution increases. Table I shows this relationship for surface conductivity of coated polyester.

Several examples of the solution contemplated by the present invention follow:

EXAMPLE I

| MATERIAL | WET % | DRY % |
| --- | --- | --- |
| Ethylene Glycol Monomethyl Ether (EM) | 69.7 | |
| Nitrocellulose (RSNC ¼ sec - made by Hercules - wet compound is 70% nitrocellulose and 30% isopropyl alcohol) | 11.0 | 7.7 |
| Conductive Polymer (261LV made by Calgon - wet is 40% Conductive Quarternary Ammonium Polymer and 60% water) | 19.3 | 7.7 |

The above formulation was coated on 7 mil ICI Polyester Melinex #505 with a #14 Meyer Rod. When the surface resistivity of the dry coated clear transparent surface was measured with a Keithley Electrometer the surface resistivity was $6.1 \times 10^7$ ohms/square. Due to the insulating characteristics of the polyester substrate the volume resistivity of the coated film was higher than $10^{15}$ ohms-inches. The uncoated surface resistivity of the polyester film was approximately $5 \times 10^{15}$ ohms/square. The coating of the above formulation reduced the surface resistivity of polyester film about 8 decades. The transparent coating was hard and durable with good adhesion to the polyester substrate.

The formulation set out in Example I was used to impregnate a 3 mil thick raw cellophane laminate using an immersion tank and nip rollers and subsequently further dried as described above. The following resistivities were measured with a Keithley Electrometer at 71° F., 60% relative humidity:

| Material | Surface Resistivity (ohms/sq. average both surfaces) | Volume Resistivity (ohms-inches) |
| --- | --- | --- |
| "Untreated" Raw Cellophane Laminate | $1.7 \times 10^9$ | $7.8 \times 10^9$ |
| "Treated" Raw Cellophane Laminate | $1.8 \times 10^8$ | $4.7 \times 10^7$ |

The impregnations of the cellophane laminate with the above formulation reduced the volume resistivity more than two decades and reduced the average surface resistivity about one decade.

The above impregnated cellophane laminate had little or no change in the length and width dimensions of a 6"×6" square when exposed to a change in relative humidity from 56% to 92% over ninety minutes in a humidity chamber.

EXAMPLE II

The following formula can be prepared:

| MATERIAL | WET % | DRY % |
| --- | --- | --- |
| Methyl alcohol | 75 | — |
| Nitrocellulose (SS grade ¼ sec made by Hercules - wet compound includes 30% isopropyl alcohol) | 22.5 | 94 |
| Conductive Polymer | 2.5 | 6 |

| MATERIAL | WET % | DRY % |
|---|---|---|
| (Calgon 261LV - wet compound is 60% water, 40% dry polymer) | | |

The above formulation was coated using a #14 Meyer Rod on 7 mil ICI Melinex 505 and dried. The "uncoated" side of the Melinex #505 had a surface resistivity of $5.3 \times 10^{15}$ ohms/square at 70° F., 50% relative humidity. The "coated" side of the Melinex 505 had a surface resistivity of $3.3 \times 10^{13}$ ohms/square at 70° F., 50% relative humidity.

As little as 6% conductive polymer (261LV) to 94% nitrocellulose reduced the surface resistivity of the polyester film over two decades.

It is clearly seen that the present invention provides a significant improvement in solutions for increasing the surface or through-conductivity of a substrate and the dimensional stability of the certain substrates.

The use of this formulation as is or with a somewhat higher percentage of conductive polymer is very well suited for reducing the tendency to generate static electricity on the surface of a substrate.

From the above description, it will be apparent that there is thus provided a solution with the advantages mentioned as desirable, but which is clearly susceptable to modification in its form and operation in the proportions and arrangement without departing from the principles involved or sacrificing any of its advantages.

It is also to be understood that the invention is not limited to the specific solution described but the means, method and construction herein disclosed comprise a preferred form of several modes of putting the invention into effect, and the invention, is therefore, claimed in any of its forms and modifications with the legitimate and valid scope of the appended claims.

What is claimed is:

1. A chemical solution for increasing the conductivity of a substrate consisting of:
   nitrocellulose and a quarternary ammonium compound dissolved in a solvent selected from the group consisting of ethylene glycol monomethyl ether, methyl alcohol and mixtures thereof.
2. The chemical solution of claim 1 further consisting of: isopropyl alcohol.
3. The chemical solution of claim 1 further consisting of water.
4. The chemical solution of claim 1 wherein the proportion of the nitrocellulose and the proportion of the quarternary ammonium compound are approximately equal.
5. The chemical solution of claim 1 wherein:
   nitrocellulose is approximately 8 percent of the total solution, and
   the quarternary ammonium compound is approximately 8 percent of the total solution.
6. A chemical solution for increasing the conductivity of a substrate consisting of:
   from 4.9 to 39.5 percent nitrocellulose relative to and from 0.5 to 15.6 percent of a quarternary ammonium compound dissolved in a solvent selected from the group consisting of ethylene glycol monomethyl ether, methyl alcohol and mixtures thereof.
7. The chemical solution of claim 6 further consisting of: isopropyl alcohol.
8. The chemical solution of claim 6 further consisting of: water.
9. The chemical solution of claim 6 wherein the solvent is from 40 to 80 percent of the solution.
10. A chemical solution to be used as a coating on a substrate to increase the surface conductivity of the substrate consisting of:
    from 4.9 to 39.5 percent of the total solution nitrocellulose, and
    from 0.5 to 15.6 percent of the total solution of a quarternary ammonium compound both dissolved in a solvent selected from the group consisting of ethylene glycol monomethyl ether and methyl alcohol.
11. The chemical solution of claim 10 wherein:
    nitrocellulose comprises approximately 8 percent of the total solution; and
    the quarternary ammonium compound comprises approximately 8 percent of the total solution.
12. The chemical solution of claim 11 further consisting of:
    approximately 3 percent isopropyl alcohol and approximately 11 percent water.
13. A chemical solution for impregnating a substrate to increase the through-conductivity and the dimensional stability of the substrate consisting of:
    from 4.9 to 39.5 percent of the total solution nitrocellulose, and
    from 0.5 to 15.6 percent of the total solution of quarternary ammonium compound both dissolved in a solvent selected from the group consisting of ethylene glycol monomethyl ether, methyl alcohol and mixtures thereof.
14. The chemical solution of claim 13 wherein:
    nitrocellulose comprises approximately 8 percent of the total solution, and
    the quarternary ammonium compound comprises approximately 8 percent of the total solution.
15. The chemical solution of claim 14 further consisting of:
    approximately 3 percent isopropyl alcohol and approximately 11 percent water.

* * * * *